United States Patent
Hargis

(10) Patent No.: US 9,685,903 B2
(45) Date of Patent: Jun. 20, 2017

(54) METHOD AND SYSTEM FOR CONTROLLING A POWER OUTPUT OF AN INVERTER

(71) Applicant: Control Techniques Limited, Newtown (GB)

(72) Inventor: Colin Hargis, Oswestry (GB)

(73) Assignee: NIDEC CONTROL TECHNIQUES LIMITED, Newtown (GB)

( * ) Notice: Subject to any disclaimer, the term of this patent is extended or adjusted under 35 U.S.C. 154(b) by 129 days.

(21) Appl. No.: 14/597,625

(22) Filed: Jan. 15, 2015

(65) Prior Publication Data

US 2015/0200624 A1  Jul. 16, 2015

(30) Foreign Application Priority Data

Jan. 15, 2014 (GB) .................................. 1400670.4

(51) Int. Cl.
*H02M 7/44* (2006.01)
*H02S 40/32* (2014.01)
*G05F 1/67* (2006.01)

(52) U.S. Cl.
CPC ............... *H02S 40/32* (2014.12); *G05F 1/67* (2013.01); *H02M 7/44* (2013.01); *Y02E 10/58* (2013.01)

(58) Field of Classification Search
CPC .......... H02M 7/44; H02M 7/445; H02M 7/48; G05F 1/67; H02S 40/32

See application file for complete search history.

(56) References Cited

U.S. PATENT DOCUMENTS

| 5,047,914 A * | 9/1991 | Dhyanchand ..... H02M 7/53803 363/132 |
| 2008/0278983 A1 * | 11/2008 | Park ......................... H02J 7/35 363/95 |
| 2010/0052627 A1 * | 3/2010 | Otsuka .................. H02M 3/156 323/225 |
| 2010/0275966 A1 | 11/2010 | Folts et al. |
| 2013/0155735 A1 | 6/2013 | Ilic et al. |
| 2013/0307339 A1 | 11/2013 | Subramanium et al. |

FOREIGN PATENT DOCUMENTS

WO    2013/177360    11/2013

* cited by examiner

*Primary Examiner* — Matthew Nguyen
(74) *Attorney, Agent, or Firm* — Harness, Dickey & Pierce, P.L.C.

(57) ABSTRACT

According to a first aspect of the disclosure, there is provided a method of controlling a power output of an inverter. The method comprises measuring an output current of the inverter, determining a difference between the output current and a reference current, and controlling a reference input voltage of the inverter as a function of the determined difference. In a second aspect of the disclosure, there is described a system for controlling a power output of an inverter. The system comprises an inverter arranged to output a current as a function of a reference input voltage. The system further comprises a controller arranged to determine a difference between the output current and a reference current. The controller is further arranged to control the reference input voltage as a function of the determined difference. The method may allow for control of a photovoltaic inverter at a power less than its maximum capability for a given solar irradiation, which may avoid the problem of the photovoltaic array voltage rising above a level where the inverter can run.

14 Claims, 3 Drawing Sheets

METHOD AND SYSTEM FOR CONTROLLING A POWER OUTPUT OF AN INVERTER

CROSS-REFERENCE TO RELATED APPLICATION

This application claims the benefit and priority of Great Britain Patent Application No. 1400670.4 filed Jan. 15, 2014. The entire disclosure of the above application is incorporated herein by reference.

FIELD

The present disclosure relates to a method and corresponding system for controlling a power output of an inverter, especially a photovoltaic inverter. In particular the disclosure relates to a method and system for limiting the power output of an inverter.

BACKGROUND

This section provides background information related to the present disclosure which is not necessarily prior art.

Traditionally, a photovoltaic inverter is operated at the Maximum Power Point (MPP) in order to maximise the revenue from the solar panel plant. For example, in US 2013/0155735, there is shown in FIG. 2B a control system which controls the inverter so that the photovoltaic array voltage is held at the optimum level as required by the MPP. The integral controller (PI control) and limiter are part of the internal control arrangement of the inverter which allows it to follow the required MPP voltage.

Recently, however, there have been cases in which inverter output power needs to be restricted to below the MPP. For example, this may be because the power company has issued a command to restrict the output power of the plant, as the power system may not accept the whole power output of the plant, or for other operational reasons. In other cases, when the sun is strong, the array power output may exceed the agreed maximum export rating of the plant—this may occur if the array is deliberately over-sized relative to the inverter, and by limiting the power, such that the power varies less throughout the day. This requirement is becoming more common with the reduced capital cost of photovoltaic panels, and in parts of the world where real estate allows for the array to be over-sized relative to the rated exported power.

However, when one tries to restrict the power output of the inverter to the grid, the voltage of the array rises. Depending on the system design and the array temperature, the voltage might become too high for the inverter to run, and may rise so high that the inverter cannot operate. Conventional techniques used to address this issue include:

(a) allowing the voltage to rise and accepting the cost of a higher voltage rated inverter, or otherwise re-scaling the system to reduce the voltage, both of which result in higher cost;

(b) using an additional resistor to dissipate the unwanted power with a controller such as a "chopper" (see for example US 2010/0275966)—which is expensive and requires a facility to dissipate the heat energy generated in the resistor, and is therefore not practical in a large system.

There is therefore a need in the art for a more cost-effective and efficient means of allowing restriction or limitation of the output power of an inverter.

SUMMARY

This section provides a general summary of the disclosure, and is not a comprehensive disclosure of its full scope or all of its features.

According to a first aspect of the disclosure, there is provided a method of controlling a power output of an inverter. The method comprises measuring an output current of the inverter, determining a difference between the output current and a reference current, and controlling a reference input voltage of the inverter as a function of the determined difference.

Thus, the inventive method may allow the inverter voltage rating to be more closely matched to the photovoltaic array, giving the potential for cost saving as well as improving availability by reducing the tendency to over-voltage trips during restricted-power operation when the array voltage is high. The method may allow for control of a photovoltaic inverter at a power less than its maximum capability for a given solar irradiation, which may avoid the problem of the photovoltaic array voltage rising above a level where the inverter can run. Unwanted power may be automatically and harmlessly dissipated in the photovoltaic panels.

The reference current may correspond to a desired power output of the inverter, the desired power output being less than a maximum power output of the inverter. In other words, the reference current may be equal to a current that would produce a desired power output, for a given reference input voltage. The reference current may be derived by scaling of the required exported power with the voltage at the inverter output terminals, or by using a suitable control algorithm.

The method may further comprise switching from controlling the reference input voltage as a function of the determined difference to controlling the reference input voltage as a function of the power output of the inverter. Thus, if given the prevailing conditions the inverter is unable to produce the desired power output for a given reference current, the method may switch to traditional MPP tracking in order to continuously export maximum available power.

The switching may occur if the reference input voltage exceeds a predetermined threshold, for example if the reference input voltage reaches levels that may trigger a trip-out of the inverter. Alternatively, the predetermined threshold may be a voltage corresponding to a maximum power output of the inverter. For example, the system may determine when the MPP has been reached, in which case, in order to avoid further increase in voltage with no further increase in power output, the system may switch to MPP tracking.

The control of the reference input voltage preferably comprises feedback control. For example, the reference input voltage may be increased if the reference current is greater than the output current. In addition the reference input voltage may be decreased if the reference current is less than the output current.

In a second aspect of the disclosure, there is described a system for controlling a power output of an inverter. The system comprises an inverter arranged to output a current as a function of a reference input voltage. The system further comprises a controller arranged to determine a difference between the output current and a reference current. The controller is further arranged to control the reference input voltage as a function of the determined difference.

The system may further comprise a tracker for controlling the reference input voltage as a function of the power output of the inverter.

The system may further comprise one or more switches for switching between control of the reference input voltage by the controller and control of the reference input voltage by the tracker. The one or more switches may be arranged to switch control of the reference input voltage from the controller to the tracker when the reference input voltage exceeds a predetermined threshold. The predetermined threshold may be a voltage corresponding to a maximum power output of the inverter.

The system may further comprise a limiter arranged to detect when the reference input voltage exceeds the predetermined threshold.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The present disclosure seeks to provide an improved method and system for controlling a power output of an inverter. Whilst various embodiments of the disclosure are described below, the disclosure is not limited to these embodiments, and variations of these embodiments may well fall within the scope of the disclosure which is to be limited only by the appended claims.

Before describing an embodiment of the disclosure in detail, a brief discussion of the operation of typical prior art inverters follows.

Typically, an inverter is operated with internal control loops which adapt the active component of the output current to give a desired reference value of DC input voltage. The loops work so that if the voltage increases then the active current is increased, which therefore increases the inverter input current and corrects the change in voltage. In the usual MPP tracking mode, this reference voltage is continuously modulated to find the optimum value, using a tracking algorithm of which many are known.

Figure 1B:
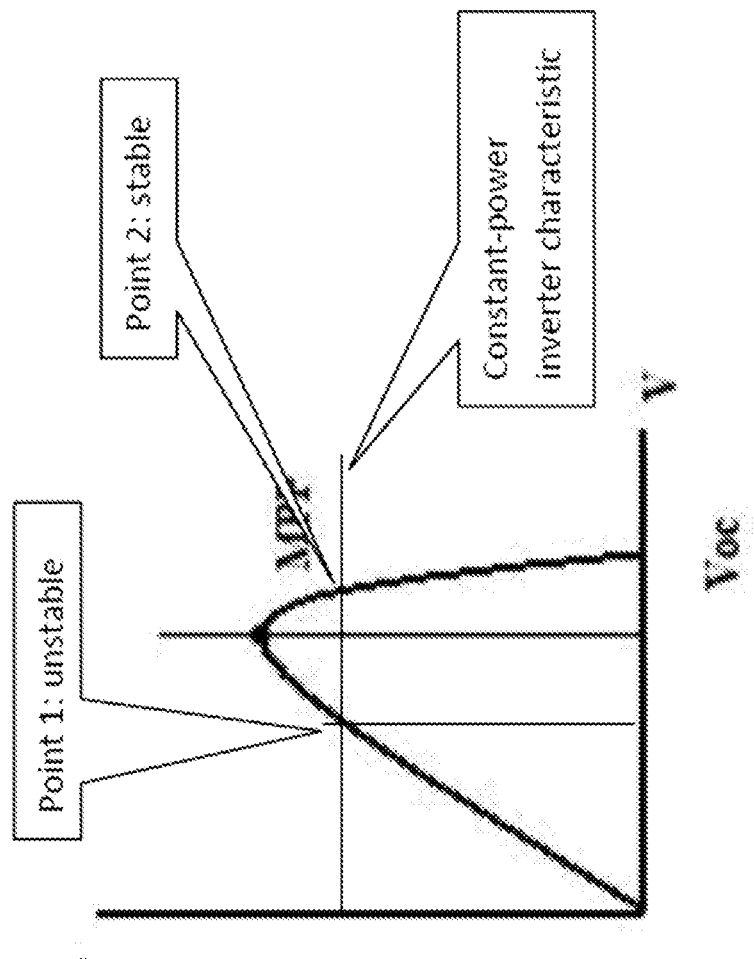
FIG. 1b is a graph showing a typical power/voltage curve of an inverter.
Figure 1A:
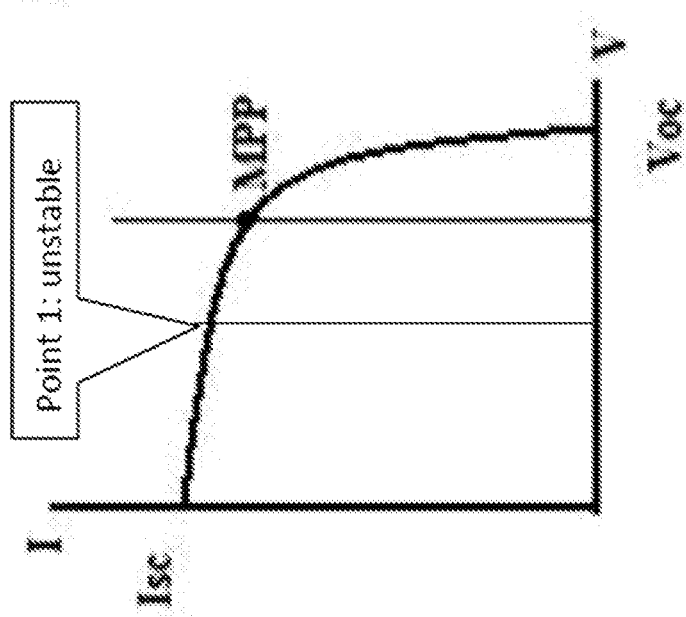
FIG. 1a is a graph showing a typical current/voltage curve of an inverter.

If the power output is required to be below the MPP, then there is a need to control the inverter so as to give a constant output power at the desired value. There then generally exists two possible pairs of values of voltage and current. This is shown in FIGS. 1a and 1b, which illustrate typical photovoltaic array current and power functions of voltage, showing possible operating points for fixed power.

At point 1, a small increase in voltage results in an increase in power delivered from the array, since the current only falls by a small amount whilst the voltage increases by a correspondingly greater amount. This then results in a further increase in voltage so that the system rapidly moves over the power curve to point 2. At point 2, any further increase in voltage results in a rapid fall in current (as per FIG. 1a) and power delivered from the array, so the system naturally settles at point 2. Thus, without intervention, if the power exported is fixed in the inverter control system, then the system naturally moves to the higher voltage state, i.e. point 2 in FIG. 1b, because that state is inherently stable.

In order to obtain stable operation at point 1 (e.g. at a lower voltage), it is necessary to implement a control function which defeats the natural tendency to instability when the power is regulated. If the inverter is simply operated with a fixed voltage reference value, then stable operation is possible at any (physically realisable) voltage. In this mode, the inverter internal control loops act to regulate the voltage by exporting more power if it tends to rise, counteracting the tendency to instability which occurs if the exported power is fixed. However, when taken alone this system does not export a controlled output power, but only an amount of power which happens to be available at the set voltage and under the prevailing conditions. Therefore, in order to export a controlled output power, an additional control function must be added.

Figure 2:
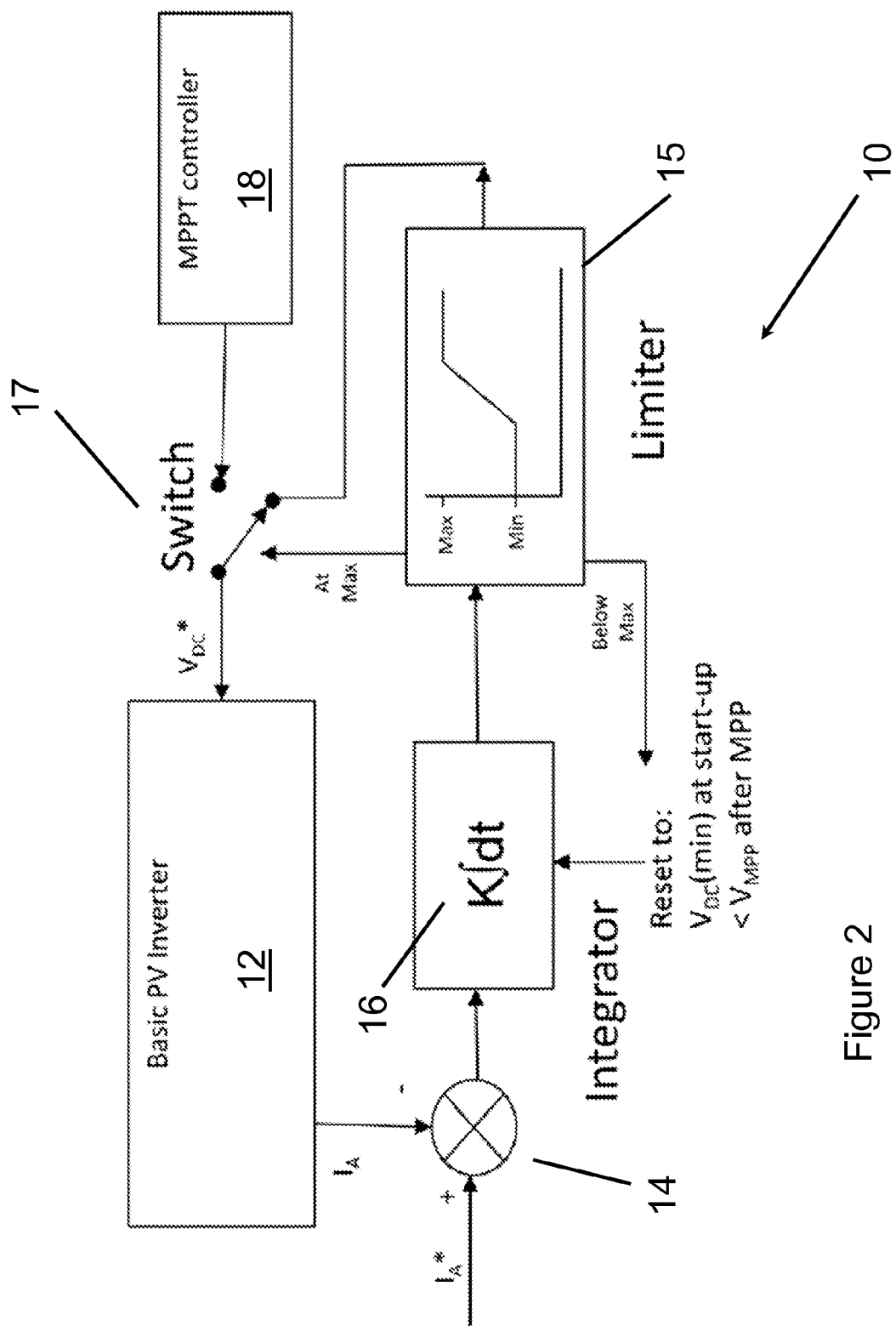
FIG. 2 is a block diagram of a system for controlling a power output of an inverter, in accordance with a preferred embodiment of the disclosure.

FIG. 2 shows a system 10 for controlling a power output of an inverter, according to a preferred embodiment of the disclosure. System 10 comprises a photovoltaic inverter 12 arranged to output an active current $I_A$. Current $I_A$ is fed into a subtraction block 14 or other suitable device into which is also received a reference current $I_A^*$. Subtraction block 14 is connected to integrator 16 which is arranged to control a reference DC link voltage $V_{DC}^*$ input to inverter 12. Integrator 16 may be implemented in software in inverter 12, or a separate controller, or in hardware, by techniques which are well known. System 10 further includes MPP tracking controller 18. A switching element 17 is arranged to alternately allow integrator 16 and MPP tracking controller 18 to regulate $V_{DC}^*$. Switching element 17 is controlled by limiter 15 which detects when a maximum voltage is reached.

System 10 takes advantage of the fact that when operating on the rising flank of the power/voltage curve (i.e. the side comprising point 1 in FIG. 1b), below the MPP, an increase in the DC voltage set in inverter 12 results in an increase in exported power. The phase of integrator 16 is such that stable control is achievable in this state, whereas for voltage above the MPP the feedback becomes positive and the control is not stable.

Inverter 12 includes a control system which may act to control the active current $I_A$ exported to the AC power grid so as to maintain the DC link voltage $V_{DC}$ at a desired value. In a conventional application using a maximum power point tracker (MPPT) to maximise the power extracted from the photovoltaic array, MPP tracking controller 18 would control the DC link voltage reference value.

According to the present disclosure, the desired active current is specified as a reference (e.g. desired) value input $I_A^*$. The desired current $I_A^*$ is compared in subtraction block 14 with the actual current $I_A$ output by inverter 12, which is available as data within inverter 12. The difference is processed through integrator 16 using an integral control function, in order to determine the reference value of DC link voltage $V_{DC}^*$. This is instead of the voltage reference usually derived from the MPP tracking algorithm.

Figure 3:
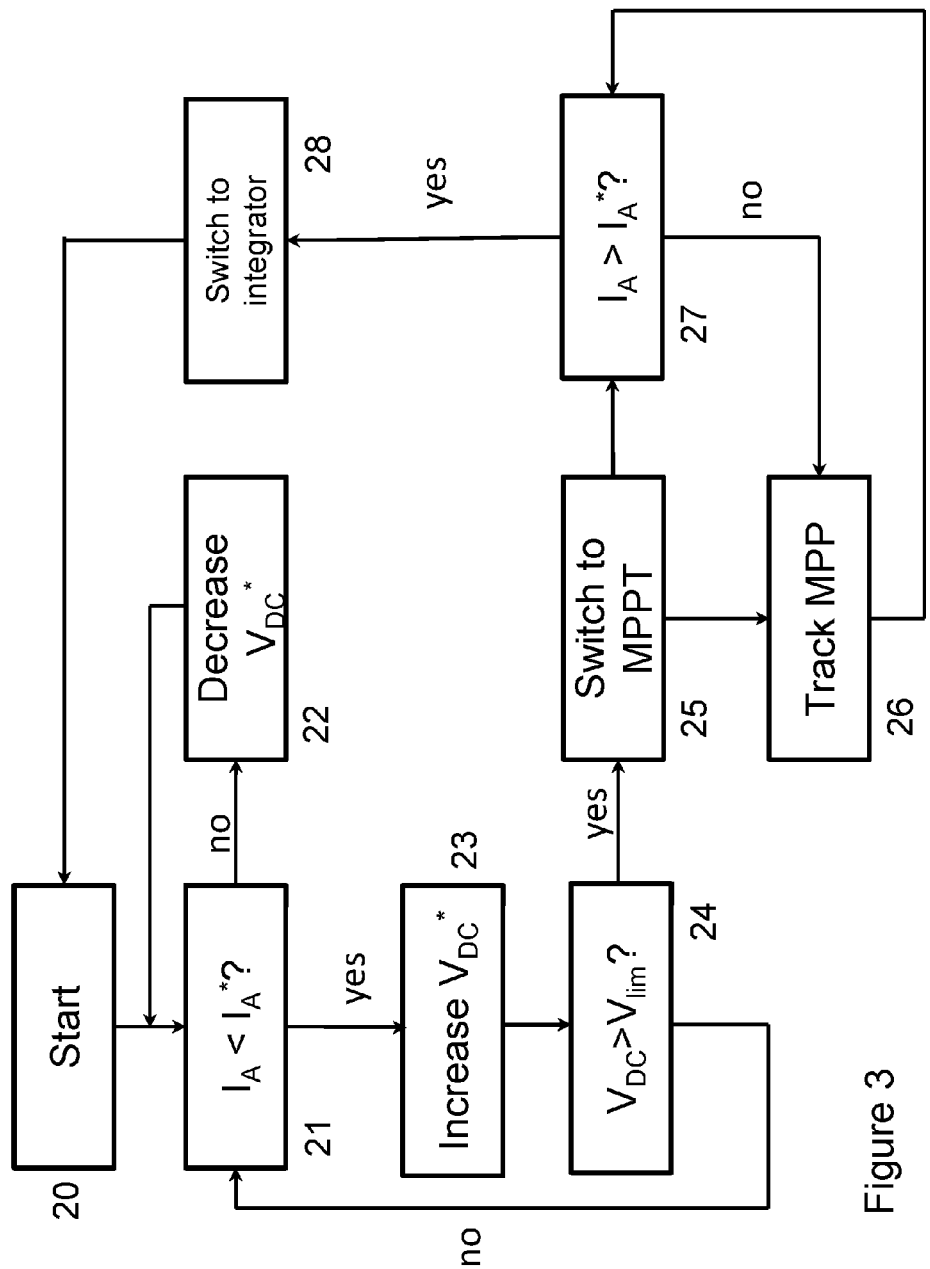
FIG. 3 is a flow chart showing a method of controlling a power output of an inverter, in accordance with a preferred embodiment of the disclosure.

Now with reference to FIG. 3, there is described a preferred method of operation of system 10.

Integrator 16 is initialised at or near to the minimum value of DC voltage permitted by inverter 12. At start-up (step 20), therefore, the DC voltage is low and the power exported by the photovoltaic array is at the minimum value possible with reduced voltage. Therefore, the active current $I_A$ exported is also low. If the active current reference $I_A^*$ is lower than $I_A$ (step 21), then system 10 would remain at this lower voltage indefinitely, exporting the lowest possible power under the conditions (step 22), unless stopped by some other mechanism.

If exported current $I_A$ is initially less than reference current $I_A^*$, integrator 16 increases the DC voltage (step 23) so that the power received from the array increases. When the desired active current export is achieved, integrator 16 regulates the DC voltage so that no further increase in voltage occurs. The voltage control loop is preferably fast-acting so as to ensure stable operation in this condition (steps 21-22-23). By using an integral control, the constant-power control function is prevented from counteracting the inherently stable constant-voltage control.

In the event that reference current $I_A^*$ is higher than that which can be achieved under the prevailing conditions, the DC voltage continues to rise. When $V_{DC}^*$ exceeds the MPP voltage (e.g. the voltage corresponding to a maximum power output), the feedback loop becomes unstable (positive feedback) and the voltage quickly rises until it reaches a predefined limit. The voltage is subject to a limit so that inverter 12 does not trip through excessive voltage. This condition may be detected (step 24) by limiter 15, at which point switching element 17 initiates reversion to the MPPT controller 18 (step 25). In other words, if the desired output power cannot be achieved under the prevailing conditions, system 10 is arranged to revert to control under MPPT controller 18 in order to obtain maximum power output by tracking the MPP (step 26).

If the active current $I_A$ in MPPT mode then is determined to exceed reference current $I_A^*$ (step 27), switch 17 then causes control of $V_{DC}^*$ to revert to integrator 16 (step 28). Preferably, before reverting, integrator 16 is pre-loaded with a voltage less than the MPPT voltage in order to ensure that integrator 16 acts in a stable fashion to revert to the desired power.

To summarise, according to the above embodiment there is a set power (corresponding to a set active current) which is required to be exported. In this case the MPPT is not used, and switch 17 connects the inverter reference input voltage $V_{DC}^*$ to the output of controller 16, allowing control of the output current of inverter 12 so as to give the desired power. Thus, the photovoltaic array voltage may be controlled on the rising side of the power curve, where the voltage is low. Without the control loop the voltage would naturally jump up to the falling side of the power curve and find a natural balance point, but one where the voltage is relatively high and in some cases too high for inverter 12 to function. MPP tracking may still be used if there is insufficient solar energy to achieve the required power. In this case the control loop causes integrator 16 to reach its upper limit, at which point control is passed to MPPT controller 18.

Whilst the disclosure has been described in connection with preferred embodiments, it is to be understood that the disclosure is not limited to these embodiments, and that alterations, modifications, and variations of these embodiments may be carried out by the skilled person without departing from the scope of the disclosure.

For example, whilst the principle application of the disclosure lies in the field of photovoltaic converters, the concept may be equally well applicable to an alternative form of photovoltaic controller such as a DC/DC converter.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of controlling a power output of an inverter, comprising:
   measuring an output current of the inverter;
   determining a difference between the output current and a reference current; and
   controlling a reference input voltage of the inverter as a function of the determined difference so that the reference input voltage is increased if the reference current is greater than the output current and decreased if the reference current is less than the output current.

2. The method of claim 1, wherein the reference current corresponds to a desired power output of the inverter, the desired power output being less than a maximum power output of the inverter.

3. The method of claim 1, further comprising switching from controlling the reference input voltage as a function of the determined difference to controlling the reference input voltage as a function of the power output of the inverter.

4. The method of claim 3, wherein the switching occurs if the reference input voltage exceeds a predetermined threshold.

5. The method of claim 4, wherein the predetermined threshold is a voltage corresponding to a maximum power output of the inverter.

6. The method of claim 1, wherein the inverter is a photovoltaic inverter.

7. A system for controlling a power output of an inverter, comprising:
   an inverter arranged to output a current as a function of a reference input voltage; and
   a controller arranged to:
      determine a difference between the output current and a reference current; and
      control the reference input voltage as a function of the determined difference so that the reference input voltage is increased if the reference current is greater than the output current and decreased if the reference current is less than the output current.

8. The system of claim 7, further comprising:
   a tracker for controlling the reference input voltage as a function of the power output of the inverter.

9. The system of claim 8, further comprising:
   a switch for switching between control of the reference input voltage by the controller and control of the reference input voltage by the tracker.

10. The system of claim 9, wherein the switch is arranged to switch control of the reference input voltage from the controller to the tracker when the reference input voltage exceeds a predetermined threshold.

11. The system of claim 10, wherein the predetermined threshold is a voltage corresponding to a maximum power output of the inverter.

12. The system of claim 10, further comprising a limiter arranged to detect when the reference input voltage exceeds the predetermined threshold.

13. The system of claim 11, further comprising a limiter arranged to detect when the reference input voltage exceeds the predetermined threshold.

14. Machine-readable instructions stored on a non-transitory computer-readable medium and which, when executed on a machine, are arranged to carry out the method of claim 1.

\* \* \* \* \*